United States Patent
Barel et al.

(10) Patent No.: US 8,544,663 B2
(45) Date of Patent: Oct. 1, 2013

(54) PROCESS FOR DRAWING, INJECTION AND BLOWING ULTRA-LIGHT WEIGHT BOTTLES (SWERVE NECK)

(75) Inventors: Moreno Barel, San Vendemiano (IT); Elena Baldo, San Vendemiano (IT); Dino Enrico Zanette, San Vendemiano (IT)

(73) Assignee: P.E.T. Engineering, S.r.l., San Vendemiano (TV) (IT)

( * ) Notice: Subject to any disclaimer, the term of this patent is extended or adjusted under 35 U.S.C. 154(b) by 48 days.

(21) Appl. No.: 12/628,225

(22) Filed: Dec. 1, 2009

(65) Prior Publication Data

US 2012/0027966 A1 Feb. 2, 2012

(30) Foreign Application Priority Data

Dec. 30, 2008 (IT) .............................. 2008 A 00695

(51) Int. Cl.
*B65D 1/42* (2006.01)
*B65D 1/02* (2006.01)

(52) U.S. Cl.
USPC ............. 215/40; 220/656; 220/657; 220/659; 215/42

(58) Field of Classification Search
USPC ................... 220/656, 657, 658, 659; 215/40, 215/42; 428/34.1
See application file for complete search history.

(56) References Cited

U.S. PATENT DOCUMENTS

| 4,521,369 | A  | * | 6/1985  | Marcinek         | 264/532 |
|-----------|----|---|---------|------------------|---------|
| 5,364,585 | A  | * | 11/1994 | Takeuchi         | 264/520 |
| 5,913,446 | A  | * | 6/1999  | von Holdt et al. | 220/659 |
| 6,730,259 | B1 | * | 5/2004  | Ikeda et al.     | 264/520 |
| 6,890,621 | B2 | * | 5/2005  | Nakamura et al.  | 428/170 |
| 6,977,104 | B1 | * | 12/2005 | Nahill et al.    | 428/35.7 |
| 2002/0017501 | A1 | * | 2/2002 | Clements et al. | 215/46 |

FOREIGN PATENT DOCUMENTS

| CN | 2062223 U | 9/1990 |
| CN | 1226217 A | 8/1999 |
| CN | 1251072 A | 4/2000 |

* cited by examiner

*Primary Examiner* — Anthony Stashick
*Assistant Examiner* — Madison L Poos
(74) *Attorney, Agent, or Firm* — Fredrikson & Byron, P.A.

(57) ABSTRACT

A new profile of the internal neck that, instead of being simply cylindrical, presents an internal ring in proximity to, and at the height of, the support ledge plain and to which corresponds a specific profile in the area under the support ledge. These profiles allows a ring to be created of different shapes and geometries (SWERVE SHAPE) using the internal material between the support ledge and the area under the support ledge, thereby re-enforcing the neck and avoiding oval formation (creating problems with sealing and loss of content) as well as deformation of the support ledge during the blowing process, without impacting weight reduction. This invention allows for ultra-light containers with good physical-mechanical behavior. A further reduction of the width(s) using present technologies is not permissible due to insufficient radial rigidity. This present invention permits the light-weighting of various types of containers of different prime materials.

23 Claims, 9 Drawing Sheets

PROCESS FOR DRAWING, INJECTION AND BLOWING ULTRA-LIGHT WEIGHT BOTTLES (SWERVE NECK)

CROSS-REFERENCE TO RELATED APPLICATION

This application claims the benefit of the priority filing date in Italian Patent Application No. Rm 2008 A 000695 filed on Dec. 30, 2008.

FEDERALLY SPONSORED RESEARCH

None

SEQUENCE LISTING OR PROGRAM

None

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

In the last few years, there has been continuous research to obtain the lightest possible thermoplastic container. Initially, light-weighting was studied at the level of the bottle/preform profile, without reducing the physical-mechanical behavior of the bottle. Later, light-weighting was focused on the neck of the bottle, reduced dimensions, wall thickness, thickness of the support ledge, and so forth. A known example is the change from PCO 1810 to PCO 19, to arrive finally to "PCO Corvaglia". In this manner, global weight reduction has reached the actual limits. The need to use less material, for economical and environmental reasons, is becoming more pressing and imminent.

In some cases, very low weights have been developed. However, to obtain satisfactory mechanical behavior with these containers tricks, such as adding nitrogen are used. In fact once the container is opened it becomes uneasy to handle. In this context, emerged the necessity to obtained containers with good mechanical performance but light in weight.

A detailed analysis of the weight distribution of the lightest produced bottles with the lightest known necks demonstrated that the sections with the most material were the neck and the area under the support ledge. For example, some cases that were considered ranged from 40% to 26% of material accumulated in these sections. Therefore, an ultra light-weight neck (which maintains the necessary rigidity to maintain its shape during production of the container and to maintain the resistance in successive phases until the final use by the consumer) was developed without increasing the bottle body weight.

An excessive reduction in the weight of the neck, by reducing the width(s), in fact causes problems during the heating and blowing phases of the process. For example, the neck or neck support ledge deforms, which creates complications in successive phases of bottling (e.g., transportation on guides, filling, capping, and palletizing). The neck can be deformed even in these last steps.

The new preform/mould profile permits the reduction of neck widths to less than the actual limits, which, until now, have been considered necessary to avoid the oval deformation caused by the effect of the major radial resistance of this geometry.

In this way, a bottle with a weight reduction of 30-40%, with respect to those considered in the preliminary analysis, was developed. Another bottle, was also developed that was an additional 14% lighter. In these containers, taking into account the initial considerations, only 17% of the weight of the material was accumulated in the neck and under the support ledge.

Another aspect to consider is that the caps are produced with widths that resist neck deformation. This invention, which maintains the rigidity, also permits the reduction cap weight.

The particular geometry of the neck profile and of the area under the support ledge, allowing the possibility to increase the distance z, benefits the capping process and transport of the bottle. The greater the dimension is, the easier the transportation due to the greater surface area. The increase of this dimension also facilitates the capping process, allowing mandrels to easily grip the support ledge.

In the case of geometries of the "swerve" type (FIG. 1) the dimension y is about 20 to 100% greater than the dimension z of the classical cases (FIG. 2) depending on the type of neck. It can also be confirmed that part of the available surface y of the invention allows for the reduction of the diameter of the support ledge, thus obtaining a further reduction of the neck weight.

The increase in dimension from z to y facilitates the application of typical handles in the larger formats due to more space being available, and improving sturdiness through the lighter weight of the neck.

Another important aspect of this invention is that it is suitable for existing lines consisting of blowing machines, transportation lines and filling machines. This invention can also stimulate innovations in the projection and development of new systems. The various types of moulds in use today can be used by simply substituting the collars where the support ledge is held.

SUMMARY

The objective of this invention is to facilitate light-weighting of a bottle neck and of the preform without compromising performance of the neck and the area under the support ledge during the processes of blowing, filling, capping and transportation, as well as during the final use of the bottle (i.e., maintaining the shape and rigidity of the neck, the support ledge, and the area under the support ledge).

The neck maintains its round shape due to reinforcement of the material at the level of the support ledge. Deformation of the support ledge must be avoided. Sometimes, during the heating and blowing process, the support ledge is upwardly deformed and this happens mainly if it is very light. To avoid this, the neck of the bottle is positioned close to the area under the support ledge of the preform and the bottle profile has a concave ring under the support ledge with a curved section (B). This creates a resistance to the tendency of the support ledge to rise. When blown, the material adheres to the curve, creating an internal ring between the support ledge and the area under the support ledge, thus avoiding the upward movement of the support ledge. The material behaves as if it is already touching the mould and therefore exerts the force of movement on this section instead of transferring the force to the support ledge.

Figure 1:
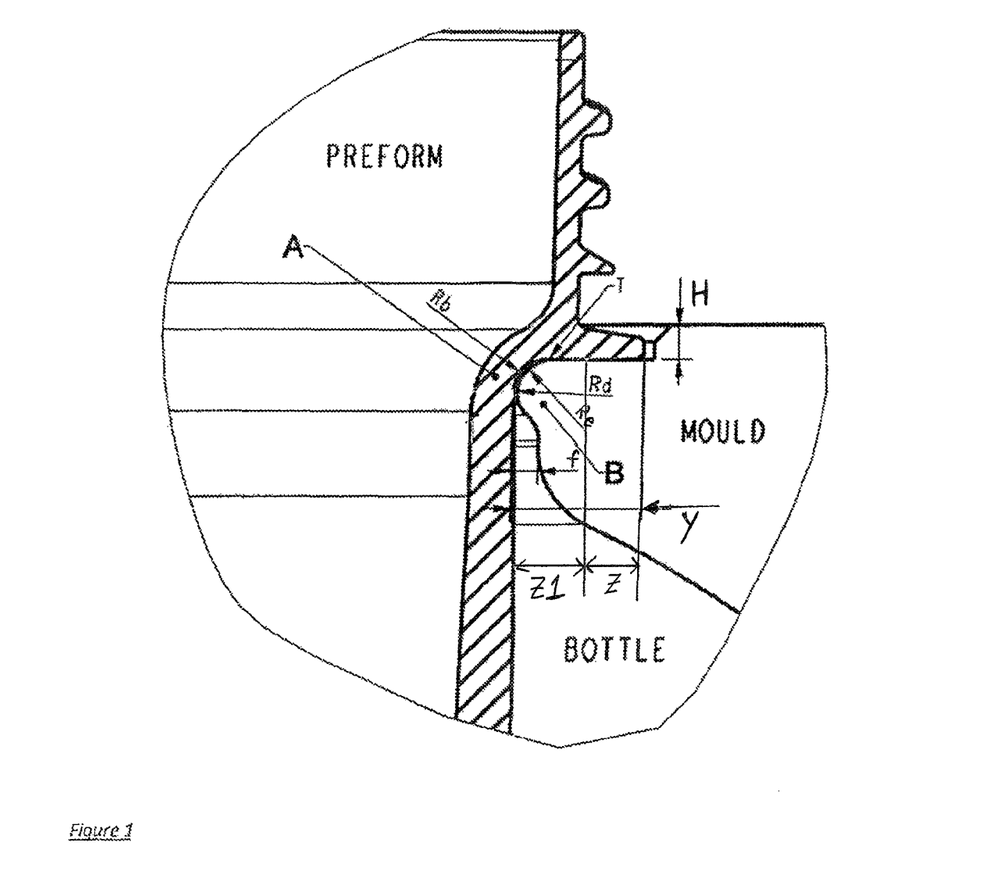
FIG. 1 is a sectional cut away view of the present invention detailing the preform profile and the internal profile of the mould which reproduces the bottle profile.

During the axial stretching process, the invention accumulates less material under the neck due to the fact that the ring under the support ledge (in the bottle mould profile) keeps the area under the support ledge of the preform at a certain distance from the mould (f in FIG. 1). This distance is sufficient to avoid the cooling of the plastic, which can be pushed towards the bottom of the bottle without being blocked above the shoulder. This easily occurs as in the case reported in FIG. 2 (classical case). In practice, the non-stretched zone is reduced with respect to classical situations, thereby better distributing all of the material along the bottle.

DESCRIPTION

A new internal profile of the preform at the neck level for the production of ultra-light-weight containers is disclosed, which maintains adequate physical-mechanical characteristics. This is feasible due to a perform profile together with a bottle profile at the height of the neck and of the area under the support ledge, making this zone robust but at the same time reduced in weight with respect to the bottle body. This invention is applicable to every existing neck finish and to every thermoplastic material (PET, OPP, PLA etc. . . . ).

FIG. 1 illustrates a preform body profile which starts from the support ledge (SL in FIG. 3) height or slightly higher instead of from the support ledge plain (P in FIG. 3) as usually occurs. From this point the preform profile goes downwards reducing the preform diameter in order to obtain a profile section that resembles one fourth of a ring which starts from the inside of the neck and extends reaching the width of the perform body (A).

Also referring to FIG. 1, a mould is contemporaneously projected for the bottle in such a way as to have, in the area under the support ledge (USL in FIG. 3) a concave ring which has a section that follows the profile of the preform as much as possible. Furthermore, the support ledge (SL in FIG. 3) of the bottle starts at the tangent point (T in FIG. 1).

Figure 3:
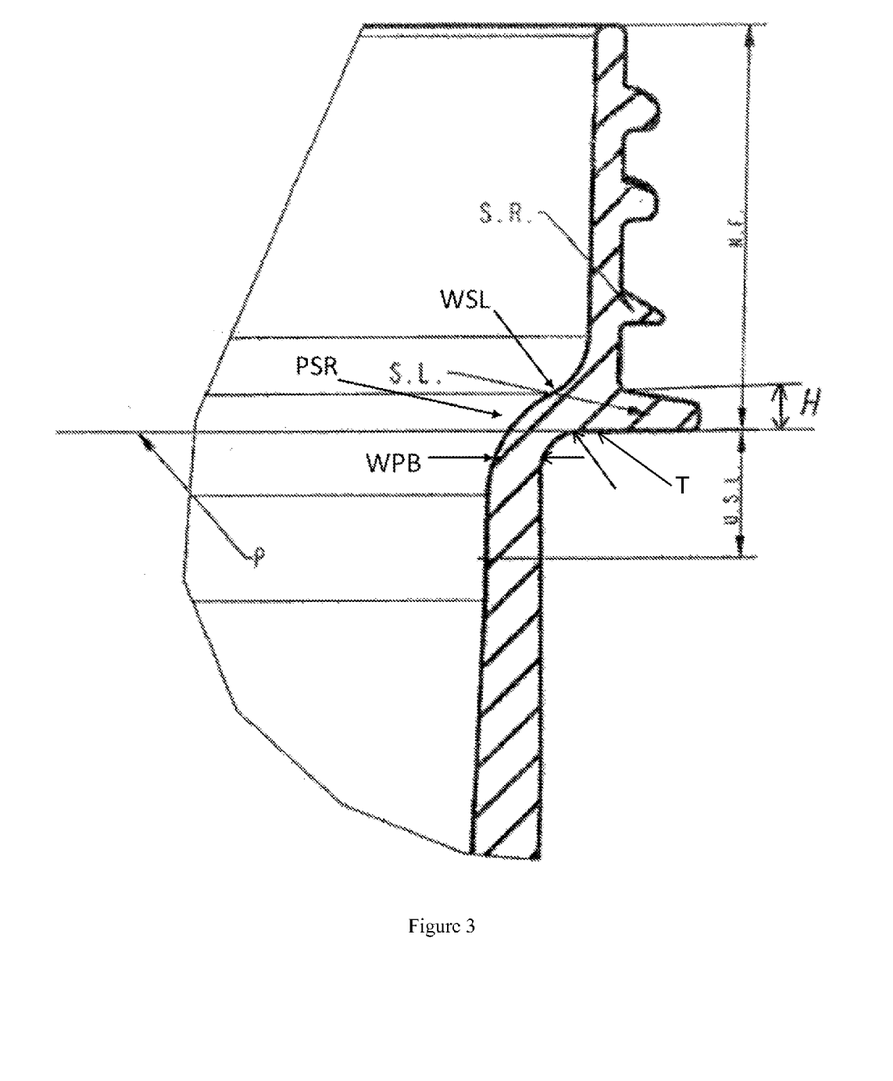
FIG. 3 is a legend indicating references to various parts of the present invention as follows:
T: Tangent Point
N.F.: Neck finish
S.R.: Sealing Ring
S.L.: Support Ledge
U.S.L.: Area Under Support Ledge
P: Support Ledge Plain
H: Support Ledge Height
PSR: Profile section that resembles one fourth of a ring
WSL: Maximum Width of the Support Ledge
WPB: Minimum Width of the Preform Body FIGS. 4, 5 and 6 demonstrates variants of the present invention with the reinforcement of the profile.

Still referring to FIG. 1, the preform body profile having a profile of one fourth of a ring (A) with a minimum width equal to the maximum width of the support ledge (SL in FIG. 3). It has an internal profile that connects to the internal profile of the neck, or which connects in tangent to the internal profile of the neck, or which connects in tangent to the internal profile of the preform body. It has an external profile that connects to the tangent plain on which the support ledge is laid. The external diameter may be reduced under the support ledge (SL in FIG. 3) by 0-20% maximum, with respect to the internal diameter of the neck. Under the support ledge (USL in FIG. 3), the diameter is about one tenth of a millimeter greater than the external diameter of the preform corresponding to the plain of the support ledge or tangent to point T (T in FIG. 1). The preform body profile has, just under the support ledge (SL in FIG. 3), a concave ring parallel to the support ledge plain (P in FIG. 3), which has a section that has two radius that follow the trend of the external profile of the ring in the area under the support ledge (USL in FIG. 3) leaving about one tenth of a millimeter of space. The preform body profile is comprised of a radius Re (FIG. 1) that starts from the tangent point T (T in FIG. 1) with a radius slightly superior to Rb (FIG. 1) to continue with a radius Rd (FIG. 1) which is approximately equal to Rb, thus obtaining the reported profile in FIG. 1.

Figure 2:
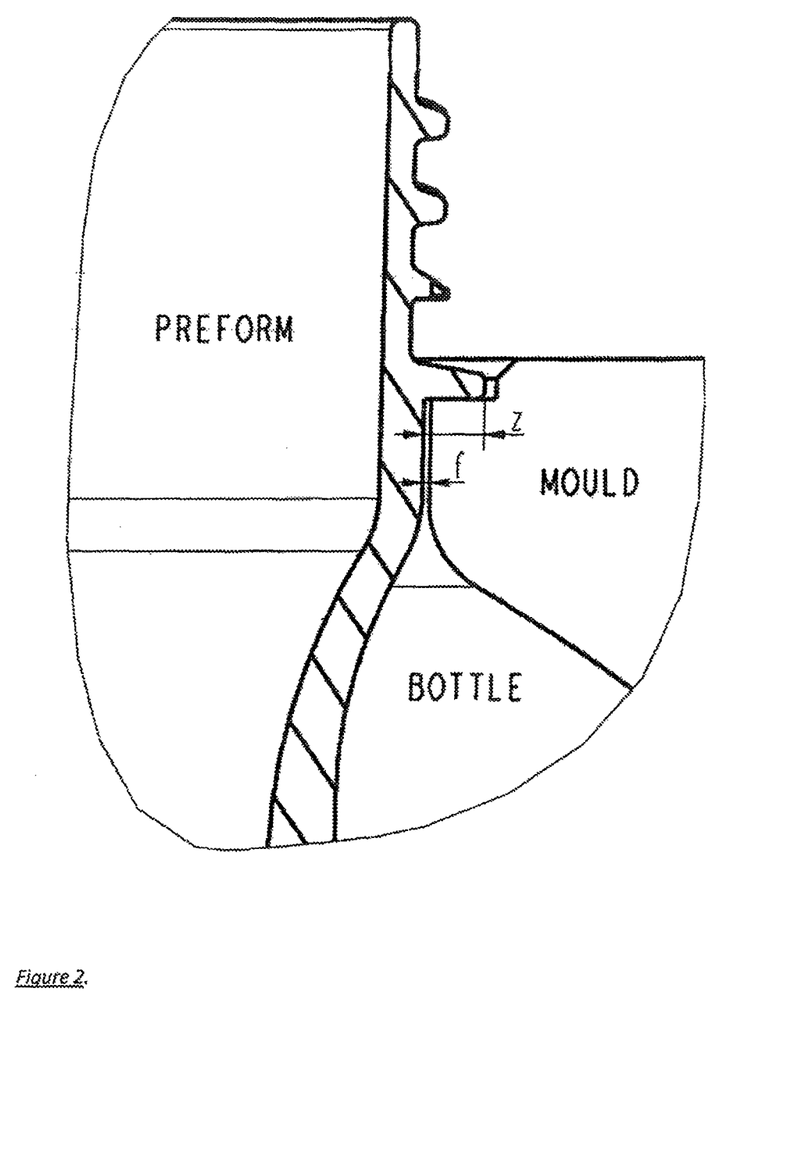
FIG. 2 is a section cut away view of the classic case detailing the preform profile and the internal profile of the mould which reproduces the bottle profile.

Referring to FIGS. 1 and 2, the present invention has a geometry of the "swerve" type (FIG. 1) wherein the dimension y is about 20 to 100% greater than the dimension z of the classical cases (FIG. 2) depending on the type of neck. It can also be confirmed that part of the available surface y of the invention allows for the reduction of the diameter of the support ledge (SL in FIG. 3), thus obtaining a further reduction of the neck weight.

The increase in dimension from z to y facilitates the application of typical handles in the larger formats due to more space being available, and improving sturdiness through the lighter weight of the neck.

The invention in FIG. 1 permits the reduction of the width (s) of the neck to values less than the present limits that, up to now, have been considered necessary to avoid the oval formation of the neck. It also permits the reduction of the diameter of the support ledge (SL in FIG. 3) since, under the support ledge (USL in FIG. 3), there remains sufficient space for the transport and capping of the bottle as can be observed with dimensions y and z as shown in FIGS. 1 and 2, respectively. The invention can be applied to every type of support ledge, every type of neck, and every type of thermoplastic material.

The invention in FIG. 1 allows a minor accumulation of material under the support ledge (USL in FIG. 3) after the blowing process, but does not require substantial modifications of blowing machines. It allows bottles of the same weight to have a heavier load of palletization and makes it easier to apply plastic handles to large formats due to the extra space resulting from the increase in the dimension from z to y (i.e., the extra space, referenced as z1, is the difference between dimensions y and z). The invention in FIG. 1 also allows for the use of lighter caps. Finally, it avoids the nesting phenomena which is common with light weight preforms.

FIG. 2 illustrates a classic bottle profile.

In reference to FIGS. 3 and 1, sometimes, during the heating and blowing process, the support ledge (SL in FIG. 3) is upwardly deformed, especially if it is very light. To avoid this, the neck of the bottle is positioned close to the area under the support ledge (USL in FIG. 3) of the preform and the bottle profile has a concave ring in the area under the support ledge (USL in FIG. 3) with a curved section (B in FIG. 1).

Figure 4:
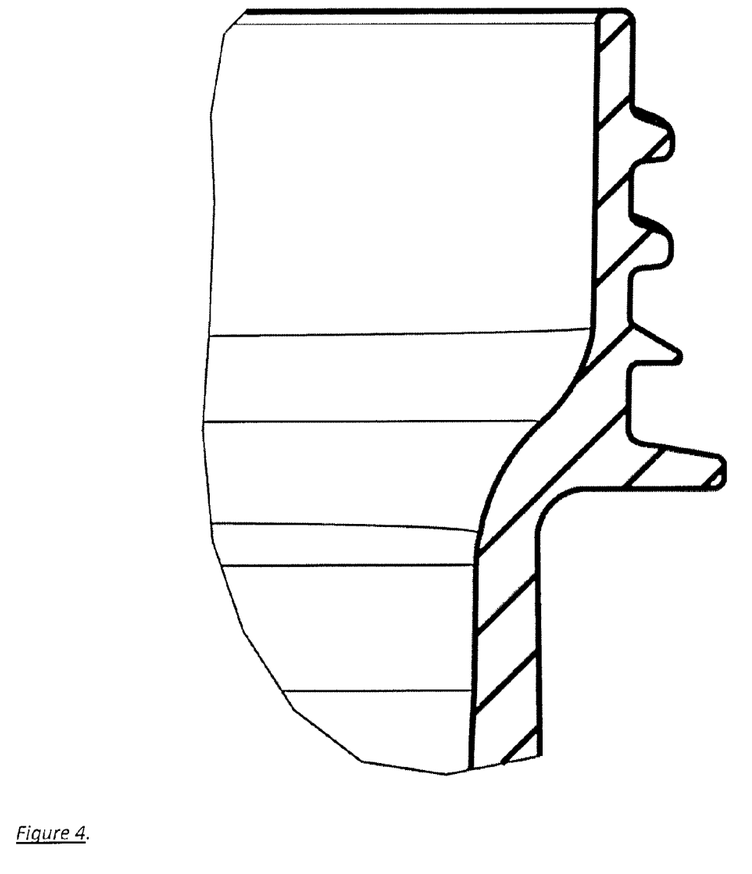
Figure 5:
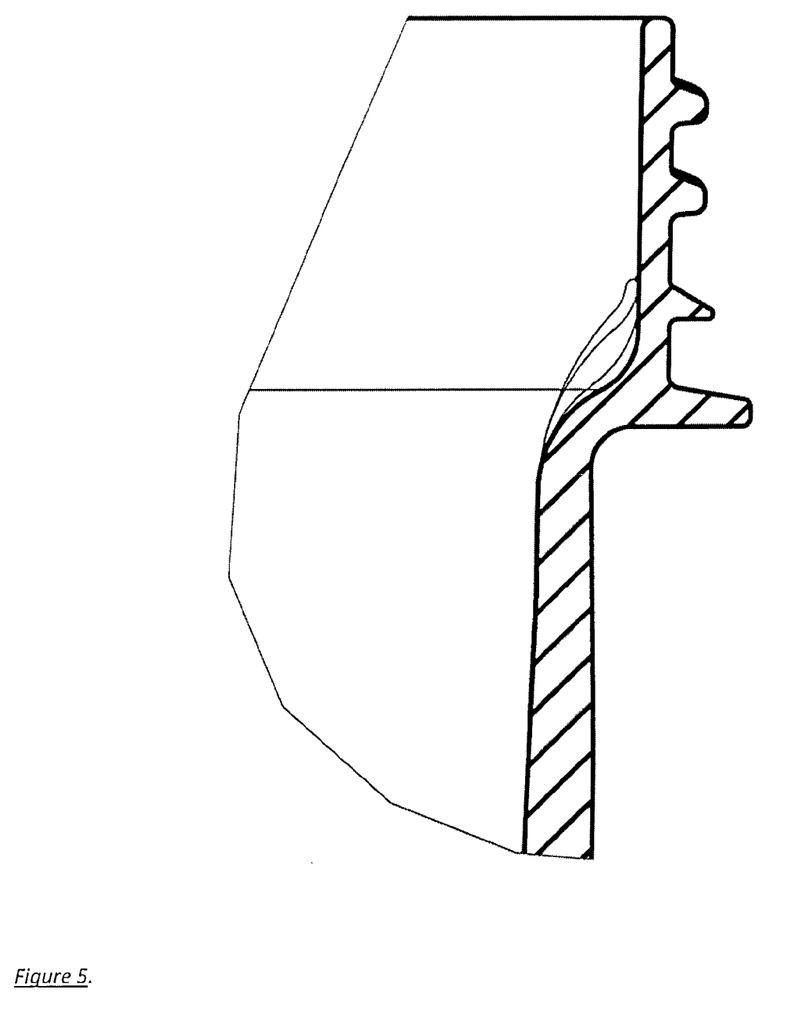
Figure 6:
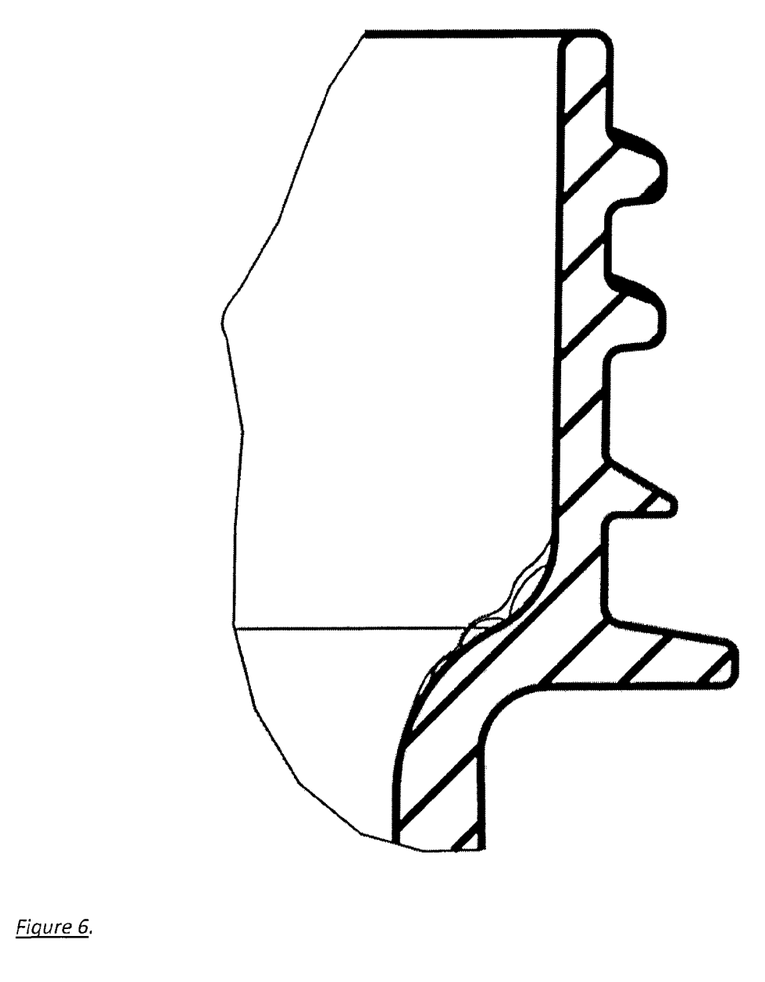

FIGS. 4, 5 and 6 demonstrates variants of the present invention with the reinforcement of the profile. The preform body profile can have variations in internal thickness of the neck at the height of the support ledge and/or greatly extended upwards increasing the internal surface area of the neck. The diameter of the neck must be sufficiently great to allow the preform to draw the internal walls inward, necessary for the extraction of the core during the injection process, and contemporaneously maintaining an adequate preform thickness. The preform body profile can have variations in the shape of the internal profile of the neck, at the height of the support ledge as seen in FIG. 6.

Figure 7:
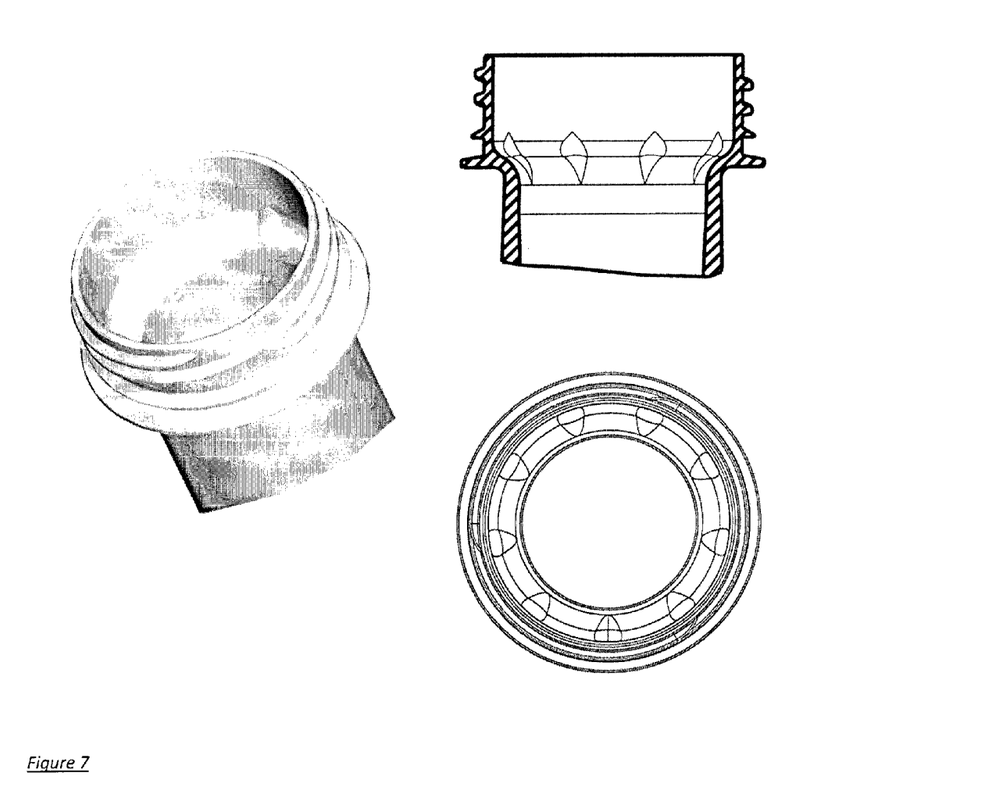
FIGS. 7 and 8 describe examples of reinforcement with ribs, a variation to the ring shown in FIGS. 4; 5; and 6.
Figure 8:
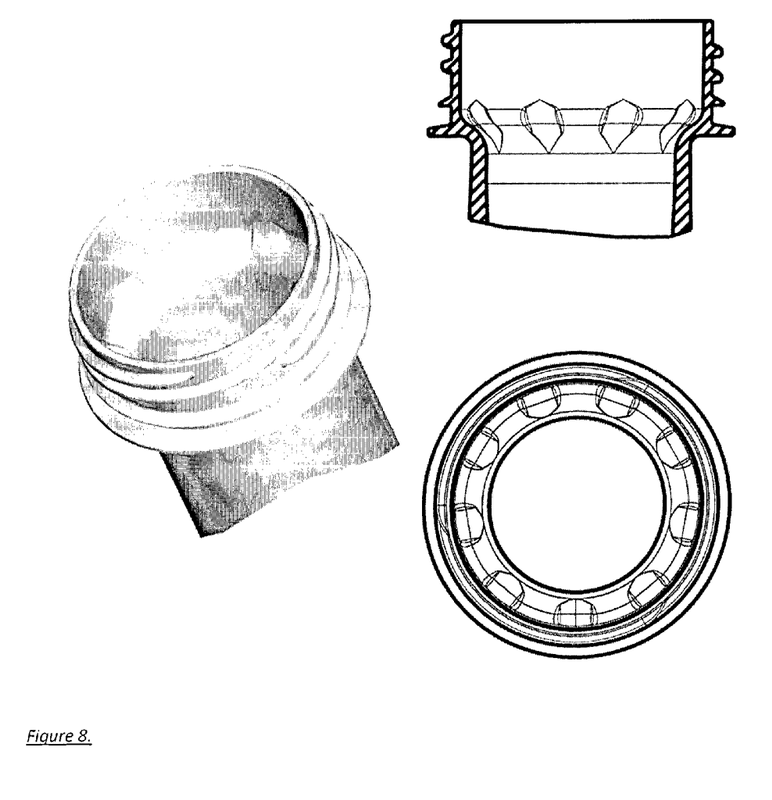

FIGS. 7 and 8 describe examples of reinforcement variations with the use of ribs. The reinforcement tends to increase weight, which can be reduced only with ribs having similar profiles.

Figure 9:
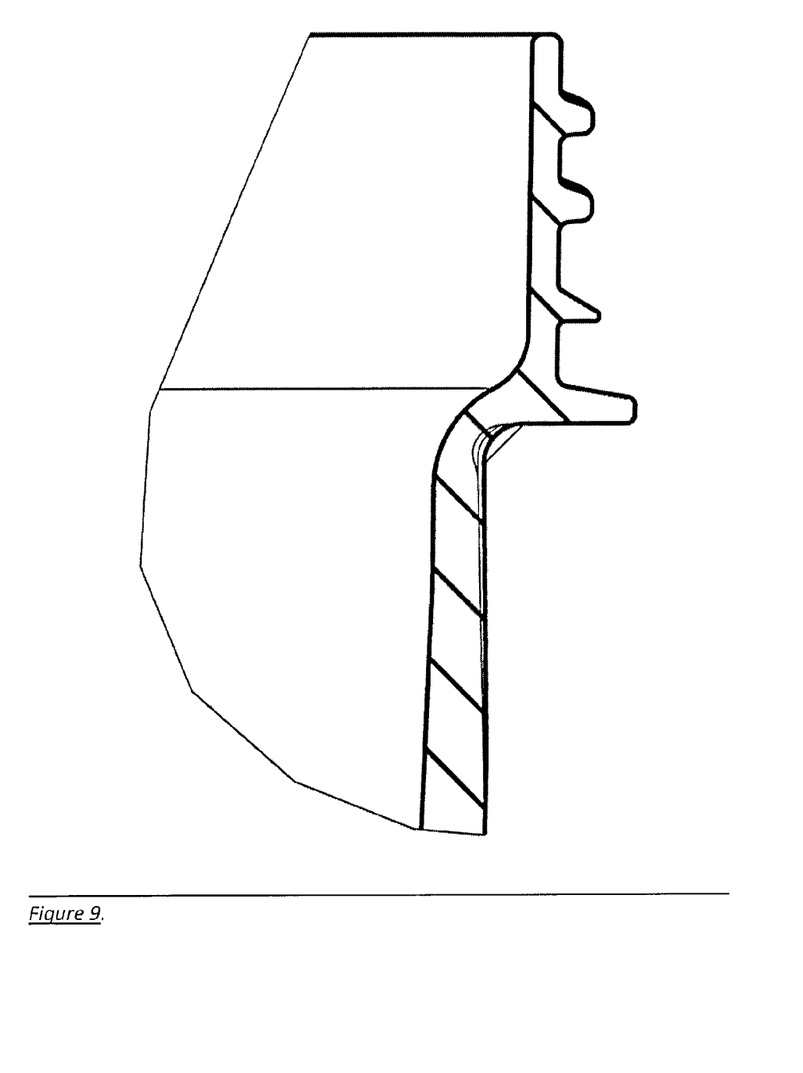
FIG. 9 describes examples of the external profile of the area under the support ledge.

FIG. 9 illustrates an example of the external profile of the area under the support ledge (USL in FIG. 3). There can be variations in the shape of the external profile of the support ledge (SL in FIG. 3).

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed:

1. A preform body profile for a bottle which starts from no lower than a height of a support ledge and extends downward so as to reduce an internal preform diameter in order to obtain a profile section that resembles one fourth of a ring starting from an inside of a neck and reaching a width of the preform body (A in FIG. 1), wherein a mould is projected for the bottle such that in an area under a support ledge, a concave ring has a section that follows the profile of the preform, and wherein the support ledge of the bottle starts at a tangent point (T in FIG. 1).

2. The preform body profile of claim 1, wherein the profile section that resembles one fourth of a ring has a minimum width equal to a maximum width of the support ledge.

3. The preform body profile of claim 1, wherein the profile section that resembles one fourth of a ring has an internal profile which connects to an internal profile of the neck.

4. The preform body profile of claim 1, wherein the profile section that resembles one fourth of a ring has an internal profile which connects in tangent to an internal profile of the neck.

5. The preform body profile of claim 1, wherein the profile section that resembles one fourth of a ring has an internal profile which connects in tangent to an internal profile of the perform body.

6. The preform body profile of claim 1, wherein the profile section that resembles one fourth of a ring has an external profile which connects to a tangent plain on which is laid the support ledge and in tangent to an external profile of the preform body.

7. The preform body profile of claim 1, wherein an external diameter under the support ledge is reduced by no more than 30% maximum with respect to an internal diameter of the neck.

8. The preform body profile of claim 1, wherein a diameter under the support ledge is about one tenth of a millimeter greater than an external diameter of the preform corresponding to a plain of the support ledge or the tangent point (T).

9. The preform body profile of claim 1, further comprising a concave ring under the support ledge and parallel to the support ledge plain, the concave ring having a section that has two radius that follow a course of an external profile of the ring of the area under the support ledge of the preform profile, leaving about one tenth of a millimeter of space.

10. The preform body profile of claim 1, further comprising a first radius (Re) that starts from the tangent point (T) and that is slightly superior to a second radius (Rb) and that continues with a third radius (Rd) which is approximately equal to the second radius (Rb).

11. The preform body profile of claim 1, wherein the profile permits a reduction of width(s) of the neck to avoid an oval formation of the neck.

12. The preform body profile of claim 1, wherein the profile is configured with a reduction of a diameter of the support ledge under the support ledge, enabling sufficient spaces for a person's fingers for grasping and subsequently transporting and/or capping of the bottle.

13. The preform body profile of claim 1, wherein a diameter of the neck enables internal walls to go inward, necessary for an extraction of a core during an injection process, and contemporaneously maintaining adequate preform thickness.

14. The preform body profile of claim 1, wherein the profile can be applied to every type of support ledge, neck and thermoplastic material.

15. The preform body profile of claim 1, wherein the neck can have variations of internal thickness at a height of the support ledge, and/or greatly extended upwards covering a greater internal surface area of the neck.

16. The preform body profile of claim 1, wherein the neck can have variations in a shape of an internal profile at a height of the support ledge.

17. The preform body profile of claim 1, wherein the bottle is reduced in weight utilizing ribs.

18. The preform body profile of claim 1, wherein the support ledge can have variations in a shape of an external profile within an interval of 0.5 mm to 2.0 mm in a second radius (Rb).

19. The preform body profile of claim 1, wherein the profile allows a minor accumulation of material under the support ledge after a blowing process, reduces a weight of a non-stretched material by 0.1 g to 5 g after the blowing process in accordance with the weight and type of bottle, and is mainly due to a greater distance (f) between the preform and the mould and to a higher flexibility of a heating process in an area under the neck support ledge due to the geometry herein described.

20. The preform body profile of claim 1, wherein the profile allows the use of a lighter cap and makes it easier to apply plastic handles for large formats due to an extra space (z1).

21. The preform body profile of claim 1, wherein the profile avoids a nesting phenomena which is common of light weight performs which principally occurs in a storage of the performs and before loading onto a blowing machine.

22. The preform body profile of claim 1, wherein the profile improves and maintains performance of the bottle in regards to an axial top load, thereby facilitating palletization of the bottles and not requiring substantial modifications of blowing machines.

23. The preform body profile of claim 1, wherein the concave ring section extends away from the support ledge, such extension being substantially perpendicular relative to the support ledge.

* * * * *